United States Patent

Hällnor et al.

[11] 3,909,080
[45] Sept. 30, 1975

[54] HYDROSTATIC BEARING

[75] Inventors: Georg Hällnor, Partille; Anders Christer Gustafsson, Lerum, both of Sweden

[73] Assignee: SKF Industrial Trading and Development Company, B.V., Jutphaas, Netherlands

[22] Filed: Oct. 17, 1973

[21] Appl. No.: 407,313

[30] Foreign Application Priority Data
Nov. 3, 1972 Sweden.............................. 14244/72

[52] U.S. Cl..................................... 308/9; 308/168
[51] Int. Cl.²........................................ F16C 35/02
[58] Field of Search ................ 308/9, 160, 122, 168

[56] References Cited
UNITED STATES PATENTS

| | | | |
|---|---|---|---|
| 2,197,432 | 4/1940 | Kingsbury | 308/9 |
| 2,621,086 | 12/1952 | King | 308/9 |
| 3,675,977 | 7/1972 | Arsenius et al. | 308/9 |

*Primary Examiner*—Evon C. Blunk
*Assistant Examiner*—Robert Saifer
*Attorney, Agent, or Firm*—Howson & Howson

[57] ABSTRACT

A hydrostatic bearing for a roller, drum or the like having a bearing surface comprising a bearing block mounted in a support member including a body member having a central cylindrical bore, a base member for mounting the body member, and a piston movable axially in the bore. The piston is formed with a pocket at one end confronting the bearing surface and has a conduit running the axial length of the piston between the pocket and its opposite axial end which confronts the bottom of the bore. The bearing further includes adjusting means for displacing the piston, including a screw member of smaller cross-section than said piston, engageable in a threaded opening in the lower axial end face of the piston. By this arrangement, the load on the bearing block is mainly supported by the pressure medium and the adjusting means is lubricated by the pressure medium in the space, between the bottom of the bore and the lower axial end face of the piston.

4 Claims, 3 Drawing Figures

HYDROSTATIC BEARING

BACKGROUND OF THE INVENTION

The present invention relates to a hydrostatic bearing for a horizontal roller, drum or the like, comprising a number of bearing blocks, each provided with at least one bearing pocket to which a pressure medium is supplied, which bearing blocks co-operate with a preferably cylindrical bearing surface which is concentric with the roller or the like, and is arranged on or in connection to the roller.

SUMMARY OF THE INVENTION

The object of the invention is to achieve a bearing of the above mentioned kind, in which the bearing blocks can be displaced and adjusted in a radial direction in relation to the cylindrical bearing surface in a simple and effective way and with simple means, which means that the axis of the body suspended in the bearing can be adjusted in a desired position very quickly and easily.

The invention is preferably used for mounting very heavy objects in bearings. The characterizing features of the invention will appear in the below claims.

BRIEF DESCRIPTION OF THE DRAWINGS

A preferred embodiment of the invention will now be described in connection to the accompanying drawings, in which.

DESCRIPTION OF THE PREFERRED EMBODIMENT

Figure 1:
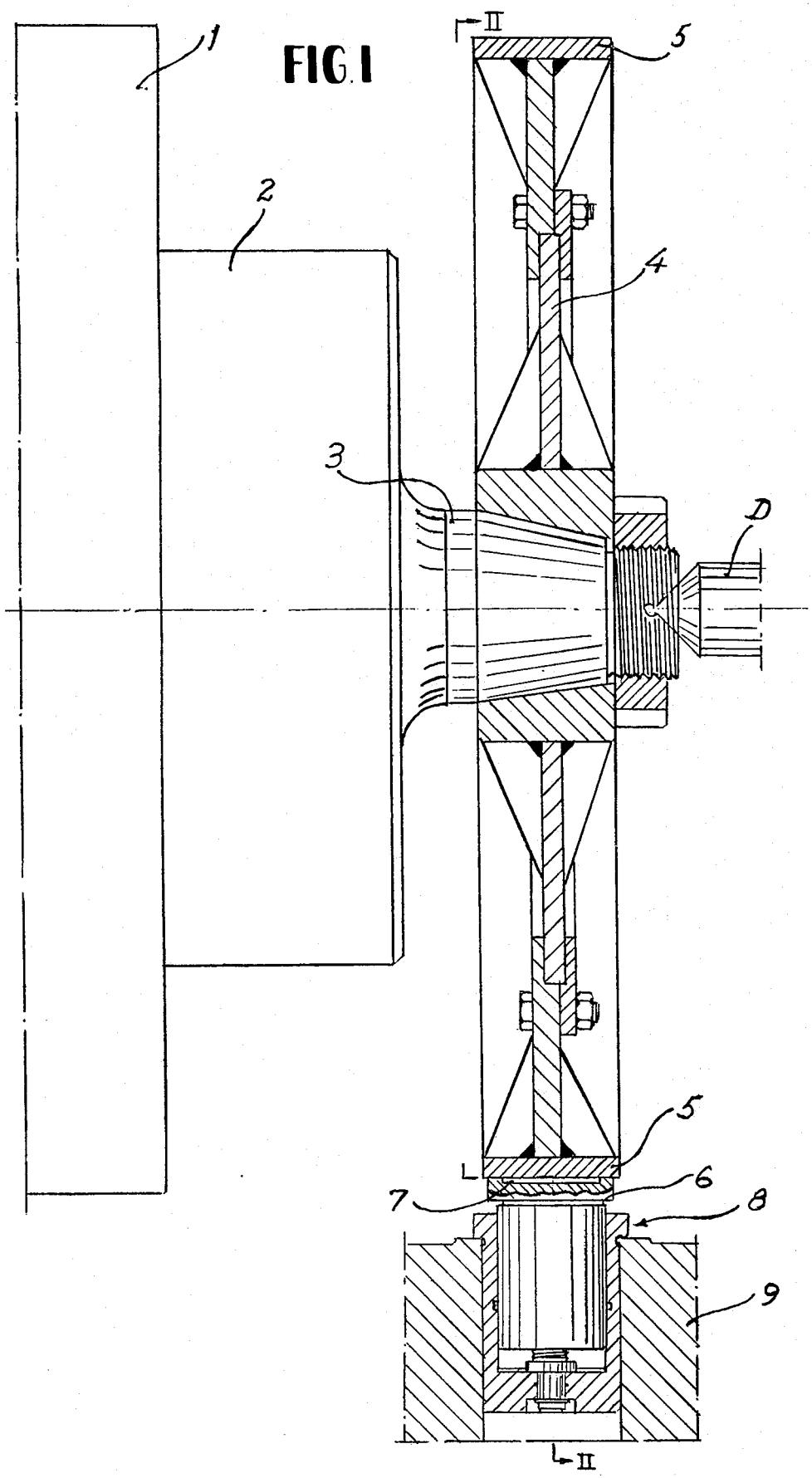
FIG. 1 shows an axial section through a bearing according to the invention at one end of a roller.
Figure 2:
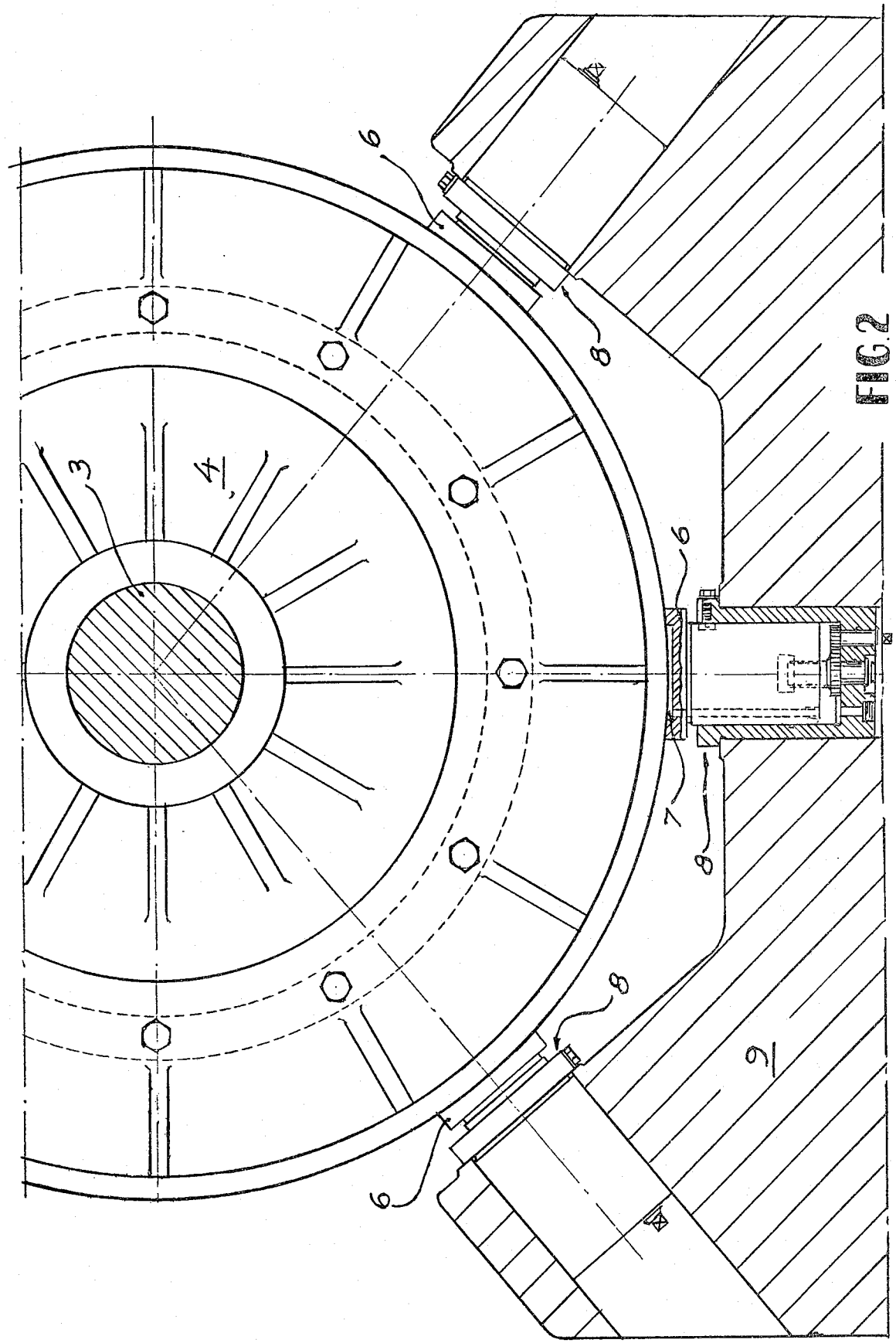
FIG. 2 shows a section along the line II—II in FIG. 1.

The FIGS. 1 and 2 show one end of a roller 1 which is provided with a tap 2,3. On the tap 3 a circular disc 4 is provided the periphery of which is provided, with a ring-shaped flange the cylindrical envelope surface of which being concentric with the roller and defining a bearing surface for cooperation with a number of hydrostatic bearing blocks 6, each of which being provided with at least one pocket 7, to which a pressure medium can be supplied. Thus, these bearing blocks support the roller 1. In the axial direction, the roller is guided by, for example, a stud D. In order to achieve a sufficient stability the bearing comprises at least two a bearing blocks each bearing surface 5, one on each side of the centre of gravity of the roller.

Figure 3:
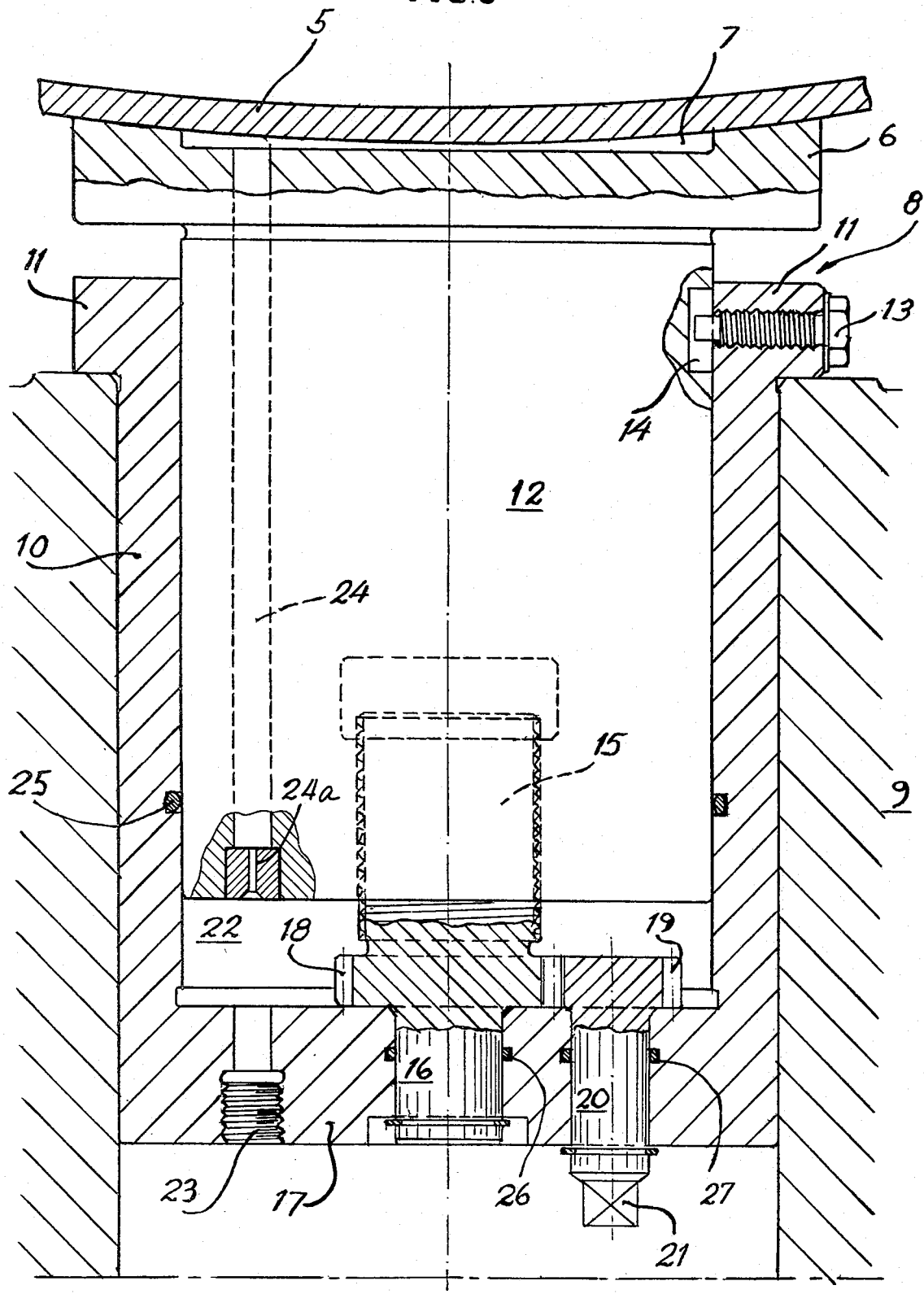
FIG. 3 shows, in a larger scale, a section of a bearing block and a support.

In the embodiment according to FIG. 2 the bearing is provided with three bearing blocks. Each bearing block is provided in a support 8, which is fixed in a basement 9 and the constructive shape of which can be seen in FIG. 3. The support comprises a body 10 with a cylindrical bore.

One end of the body is provided with a flange 11, which co-operates with the basement 9. A piston 12 is placed in the cylindrical bore, and the bearing block 6 is provided in the upper free end of the piston. The piston is secured against rotation in the bore by a screw 13, which is threaded through the body 10 and co-operates with a cavity 14 in the envelope surface of the piston. The cavity 14 has a certain axial extent in order to allow an axial displacement of the piston 12.

The lower end of the piston is provided with a threaded bore, in which a screw 15 is provided. The screw 15 is provided with a cylindrical tap 16 mounted in bearings in a bore in the bottom 17 of the body 10. The screw 15 may be turned by a gear 18,19, in which the tooth wheel 18 is fixed in screw 15 and the wheel 19 is provided on a shaft 20 which is mounted in bearings in a bore in the bottom 17, and one end of which is provided with, for example, a polygonal head 21 for co-operation with a suitable turning tool. Between the bottom of the piston 12 and the body 10 is a space 22 which in operation is filled with a pressure medium, suitably oil, which can act as a lubricant for the screw 15 and the gear 18,19.

The pressure medium is supplied to the space 22 through a channel 23 from a source which is not described in detail. The bearing pocket 7 which acts in a known manner is supplied with a pressure fluid through a channel 24 which extends between the space 22 and the bearing pocket. In order to prevent leakage from the space 22, the body 10 is provided with a number of sealing rings 25, 26, 27. The channel between the space 22 and the pocket 7 may be provided with a restrictor 24a for achieving a constant pressure in the space 22 independent of temporary pressure variations in the bearing pocket 7.

The load on the bearing block 6 is transferred to the body 10 partly via the pressure fluid in the space 22 and partly via the screw 15,16, which has a radial shoulder at the gear 18. This shoulder rests against the bottom 17 of the body 10 and provides for a certain force transmission. The effective area of the piston 12 against the space 22 is suitably made so great that under normal circumstances only a small part of the load on the bearing block 6 is transferred via the screw 15,16, which thus mainly acts as a displacement and adjustment means for the piston 12. The displacement of the piston is carried out by turning the gear 19 which transfers a torque to the gear 18. When the screw 15 thereby rotates, the piston is fed upwards or downwards independent on the direction of rotation. Thanks to the fact that the screw 15 is normal operation only takes up a small axial load it can be turned with a relatively small torque. The necessary torque on the shaft 20 for achieving a displacement of the piston 12 may be further reduced by a suitable gear ratio in the gear 18,19.

By the fact that the bearing surface 5 rests on at least two bearing blocks 6, the shaft of the roller 1 may be adjusted to desired position in vertical and lateral direction. The adjustment may be carried out with simple means by the fact that the end 21 of the shaft 20 is accessible from the outside of the support and that only a small torque is required for its turning.

The invention is not limited to the above described embodiment. It is also within the scope of the invention to arrange the bearing surface 5 directly on the roller, drum or the like, and it is not necessary that the surface 5 be cylindrical. It may, for example, also be tapered or spherical, whereby the sliding surfaces of the bearing blocks have a corresponding shape.

What is claimed is:

1. Hydrostatic bearing for a member having a bearing surface comprising at least one bearing block cooperating with the bearing surface, each bearing block mounted in a support member including a body member having a central cylindrical bore, a base member in which the body member is mounted and a piston movable axially in said bore formed with a pocket at one end confronting the bearing surface and having its opposite axial end confronting the bottom of the bore and spaced therefrom to define a chamber, means connecting the bottom of said bore and said chamber to a pressure medium supply and a conduit in said piston between said chamber and pocket to permit flow of pressure medium to said pocket and adjusting means for displacing said piston in said bore including a screw member engaging in a threaded opening in the lower axial end face of said piston and having at least a portion thereof disposed in said chamber and means for rotating said screw member to displace said piston axially in said bore, at least a portion of said screw member in said chamber being of a smaller cross section than said piston whereby load on said bearing block is mainly supported by the pressure medium in said chamber and said adjusting means is lubricated by the pressure medium therein.

2. Bearing according to claim 1, in which the screw (15) can be turned by a gear (18,19).

3. Hydrostatic bearing as claimed in claim 1 including guide means mounted in said body member cooperable with said piston to prevent rotation of said piston in said bore and permitting limited axial movement of said piston therein.

4. Hydrostatic bearing as claimed in claim 1 including flow restrictor means in said conduit operable to maintain a relatively constant pressure in said chamber independent of temporary pressure variations in said pocket.

* * * * *